United States Patent [19]

Kevern et al.

[11] Patent Number: 4,715,675
[45] Date of Patent: Dec. 29, 1987

[54] FIBER OPTIC FERRULE

[75] Inventors: James D. Kevern, Wellsville; William J. Stape, Lewisberry; Robert N. Weber, Hummelstown, all of Pa.

[73] Assignee: AMP Incorporated, Harrisburg, Pa.

[21] Appl. No.: 6,344

[22] Filed: Jan. 21, 1987

Related U.S. Application Data

[63] Continuation of Ser. No. 631,413, Jul. 16, 1984, abandoned.

[51] Int. Cl.⁴ .................................................. G02B 6/36
[52] U.S. Cl. .............................. 350/96.20; 350/96.21
[58] Field of Search ................ 350/96.20, 96.21, 96.22

[56] References Cited

U.S. PATENT DOCUMENTS

| | | | |
|---|---|---|---|
| 3,914,015 | 10/1975 | McCartney | 350/96.22 |
| 3,936,145 | 2/1976 | McCartney | 350/96.22 |
| 4,101,198 | 7/1978 | Heldt | 350/96.20 |
| 4,225,214 | 9/1980 | Hodge et al. | 350/96.21 |
| 4,240,695 | 12/1980 | Evans | 350/96.20 X |
| 4,247,163 | 1/1981 | Lumpp et al. | 350/96.21 |
| 4,354,731 | 10/1982 | Mouissie | 350/96.20 X |
| 4,395,089 | 7/1983 | McKee | 350/96.20 |
| 4,515,434 | 5/1985 | Margolin | 350/96.21 |
| 4,643,250 | 2/1987 | Margolin | 350/96.20 |

Primary Examiner—James W. Davie
Assistant Examiner—Akm E. Ullah

[57] ABSTRACT

A ferrule for electro-optic cables is formed of identical mating halves which, when assembled, provide accurate alignment of the fiber carried thereby. Each ferrule half has a mating surface with a longitudinally extending profiled groove which grips the cable and fiber and centers the fiber with respect to the ferrule. The ferrule halves are preferably permanently bonded together by well known means.

4 Claims, 3 Drawing Figures

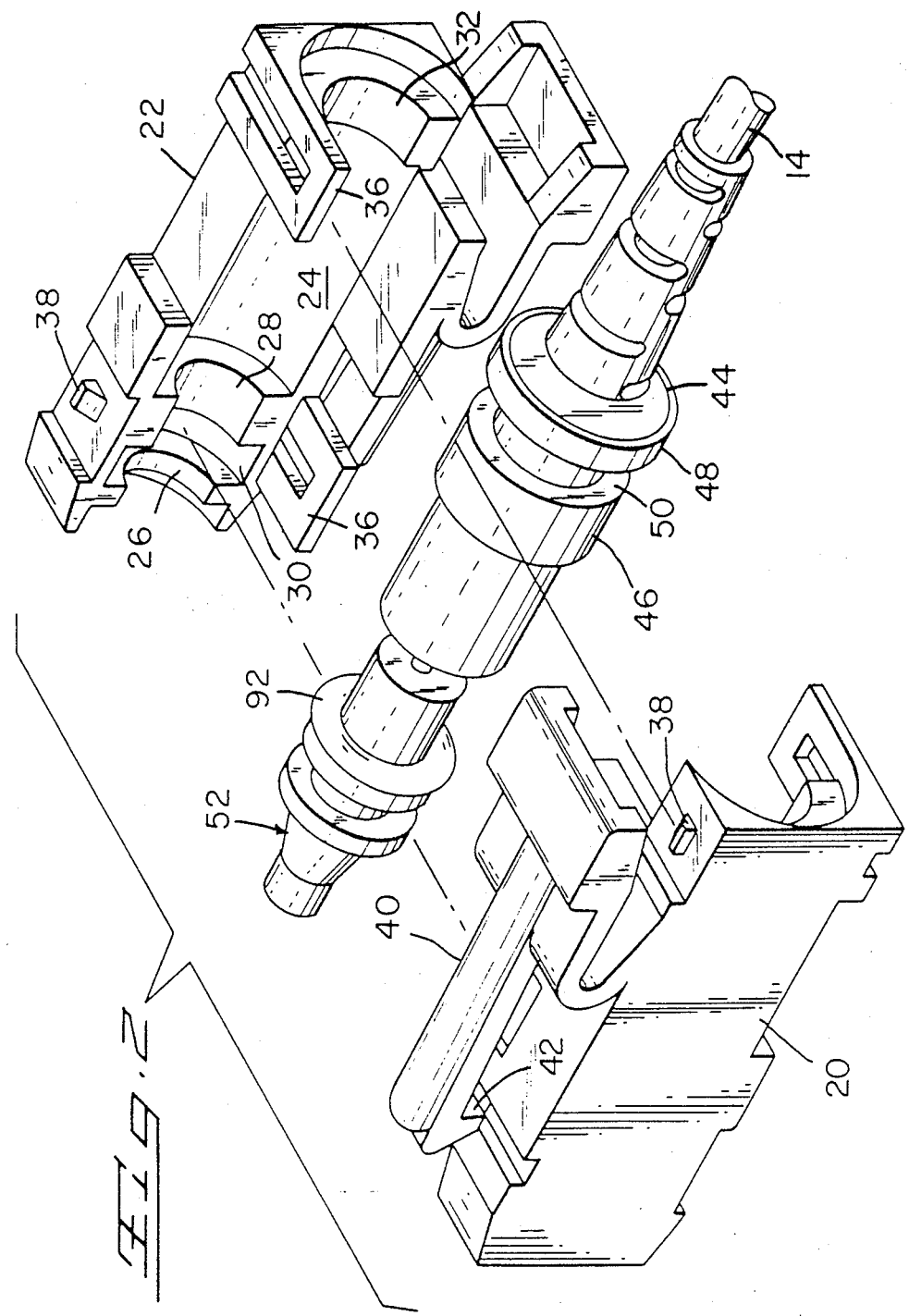

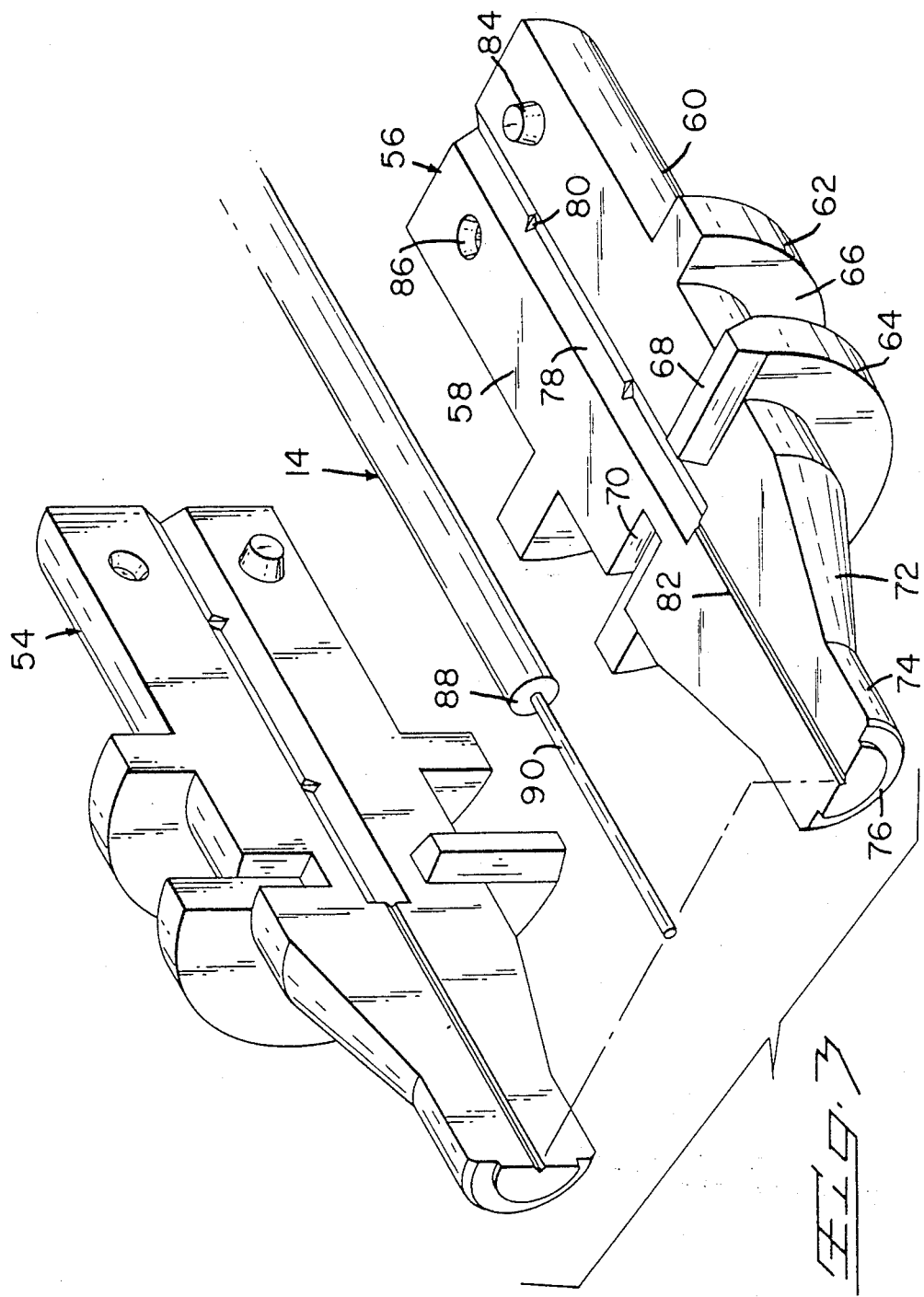

FIBER OPTIC FERRULE

This application is a Continuation of application Ser. No. 631,413 filed July 16, 1984, abandoned.

FIELD OF THE INVENTION

The present invention pertains to a ferrule for receiving electro-optic fibers and in particular to a split ferrule which is molded into two pieces and provides accurate radial alignment of fibers received in like ferrules.

BACKGROUND OF THE INVENTION

In the field of electro-optics it is quite critical to have the maximum possible radial alignment of mating fibers in order to obtain the maximum efficiency in light transfer. There have been a number of approaches taken to providing the necessary accuracy. One approach has been to mold a ferrule and then to bore a fiber passage therein by known means, such as conventional drilling or laser drilling. The disadvantage in this approach is that, while the bore is intended to be coaxial with the particular ferrule, there is no guarantee that like ferrules will wind up with axially aligned bores because of manufacturing tolerance variations.

Other approaches to obtaining radial alignment have included insertion of alignment members into the ferrule from either or both ends thereof with the intent of trapping and/or centering the fiber. A similar problems results, as previously mentioned, in that the fiber may be concentric with the particular ferrule, but there is no guarantee that it will line up with a similarly formed ferrule carrying a second fiber.

SUMMARY OF THE INVENTION

The present invention is intended to overcome the difficulties of the prior art by providing a split ferrule formed by identical integral molded ferrule halves. Each ferrule half is an integral molded member having a semicylindrical outer profile with a truncated semiconical profile at one end leading to a semicylindrical leading nose. Spaced rearwardly of the truncated semiconical portion are at least one semicircular, radially directed, integral flange for retaining the ferrule in a housing. An extension of one flange is formed on one side of the mating surface and a recess on the opposite side of the mating surface to interlock the mating ferrule halves. Each half also includes integral alignment projections and recesses and a profiled semicircular groove extending longitudinally across the center of the mating surface. The groove is stepped in size to accommodate both the bare fiber and the jacketed fiber and includes at least one protrusion to grip the jacket. The mating surface can be planar with a central groove or stepped so that mating ferrule members will define at least one tubular fiber passage.

The present invention will now be described by way of example with reference to the accompanying drawings in which:

BRIEF DESCRIPTION OF THE DRAWINGS

FIG. 2 is an exploded perspective view of an electro-optic connector of the type shown in FIG. 1 with the subject ferrule visible; and FIG. 3 is an exploded perspective view of an electro-optic ferrule according to the present invention.

DETAILED DESCRIPTION OF THE INVENTION

Figure 1:
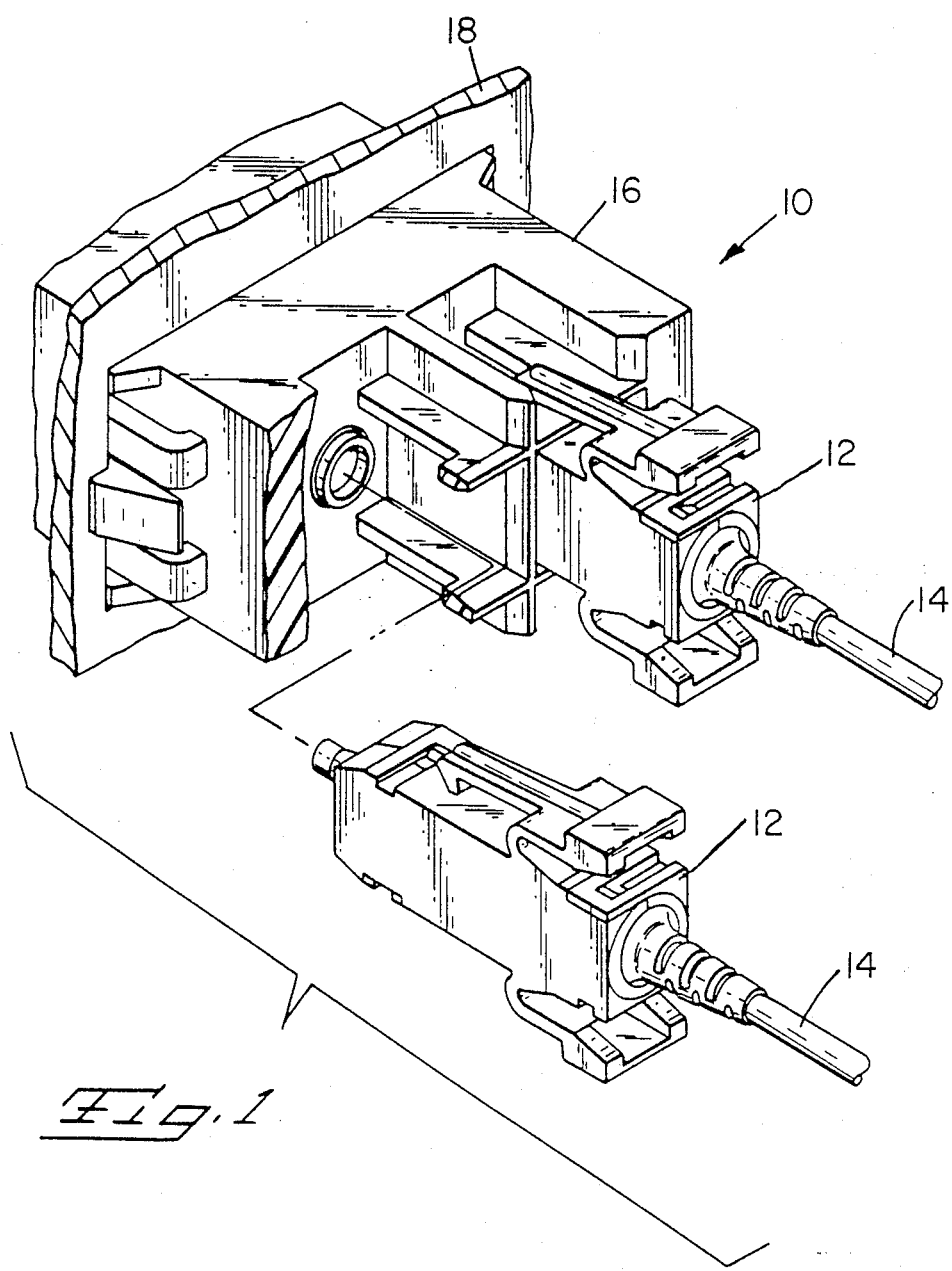
FIG. 1 is a partially exploded, partially in section, perspective view of an electro-optic connector system embodying the present invention.

The electro-optic connector system shown in FIG. 1 includes connectors 12, each terminating a respective electro-optic cable 14, and received in a receptacle 16 mounted in a panel or bulkhead 18.

Each connector 12 is shown in detail in FIG. 2 and includes a pair of hermaphroditic housing members 20, 22, which together define a central through cavity 24. At one end of the cavity 24 there are a pair of integral, inwardly directed flanges 26, 28 defining a space 30 therebetween. At the opposite end of the cavity 24 there is a single inwardly directed, integral profiled flange 32. Each housing member 20, 22 is further provided with latching means 36, each aligned to engage a respective detent 38 on the opposite housing member. Each housing member 20, 22 further has a locking assembly including an arm 40 pivotally mounted on one side and having an inwardly directed locking shoulder 42 on one end of the arm 40. Each cable 14 is provided with a strain relief 44 which includes a pair of annular flanges 46, 48 defining a space 50 therebetween. The subject ferrule 52 is mounted on the free end of the fiber 90 contained within jacketing 88 of the cable 14.

Turning now to FIG. 3, the subject ferrule 52 is formed by two identical ferrule halves 54, 56, each defining a mating surface 58 and a semicylindrical outer surface 60. In this embodiment a pair of spaced integral mounting flanges 62, 64 extend outwardly from the surface 60 defining a space 66 therebetween. Other mounting configurations could also be used. One of the flanges 64 has a portion 68 projecting above the mating surface 58 and a recess 70 aligned on the opposite side of the mating surface 58. The ferrule also includes a truncated semiconical front portion 72 leading to a semicylindrical nose portion 74 having a mating face 76. A cable receiving channel 78 extends longitudinally across the mating surface 58 and is provided with at least one integral projection 80. The channel 78 is continued by a smaller V-shaped groove 82. Each member is further provided with at least one keying projection 84 and recess 86.

The present invention is utilized by first stripping the jacket 88 off cable 14 to expose a section of the fiber 90. Not shown are the conventional strength members and buffer which would be treated in the known manner for terminating an optical fiber cable. The cable 14 is then placed in the channel 78 with the stripped fiber 90 lying in the groove 82. The projections 80 will engage in the jacket 88 to grip the cable. The two halves of the ferrule are brought together with the key projections 84 being received in the recesses 86 and the portion 68 being received in the recess 70 to position the ferrule halves with respect to each other. They are secured together by any known means such as RF induction bonding, hot melt adhesives, chemical adhesives, thermal bonding, ultrasonic bonding, molded in clips or locking devices (not shown), or external mechanical clamping by crimp rings or the like (also not shown).

As an alternative to the above, the ferrule could be formed by dual injection molding of two compatible materials one of which would bond to a like member by any of the above-mentioned processes. An example would be ferrous particle filled plastic as the second stage of a two-shot mold and bonded together by induction heating.

The thus formed ferrule is positioned in the cavity 24 with the flanges 62, 64 engaging with the flanges 26, 28 to align the ferrule. The ferrule is also preferably provided with a resilient member 92, such as the O-ring illustrated or an annular spring (not shown), which permits limited longitudinal float of the ferrule in the housing. The housing is assembled by mating the two portions 20, 22 together and the strain relief recess 50 is gripped by the flange 32. The thus formed connector can be inserted into the assembly 10 in known fashion.

An alternate embodiment, which is particularly suitable for multifiber cables, replaces the planar mating surface 58 with a profiled surface defining at least one longitudinally extending step. When like ferrule members are mated, these steps form fiber gripping tunnels and allow fibers secured by like ferrules to be axially aligned.

We claim:

1. A ferrule for permanent connection to an optical fiber cable and for assembly into an optical connector assembly, the ferrule comprising, opposing first and second identical ferrule halves construdted to engage and mate with each other, a mating surface on each corresponding ferrule half, a portion of a mating face at one end of said mating surface, a mating face constructed by said portions of a mating face for encircling an end of an optical fiber portion of an optical fiber cable, an optical fiber receiving groove extending along said mating surface and communicating with said portion of said mating face, a jacket portion receiving reces extending along said mating surface and communicating with said groove and with a rear end of a corresponding ferrule half, interengaging alignment means extending transversely of said mating surface for aligning and interengaging the opposing ferrule half, means for securing said ferrule halves together with the ferrule halves opposed along their mating surfaces with the recited grooves opposed and aligning an optical fiber portion of an optical fiber cable axially of the ferrule and with an end of the optical fiber at the mating face, and with the recesses opposed and receiving a jacket portion of an optical fiber cable, the ferrule having an exterior mounting means defined by the opposed first and second ferrule halves for mounting the ferrule within a connector assembly, on each ferrule half a projecting portion of the mounting means projects above the mating surface, on each ferrule half another portion of the mounting means is recessed below the mating surface, a recess in the mating surface aligned with said another portion of the mounting means and aligned with the projecting portion of the mounting means across the mating surface from the projecting portion of the mounting means and receives therein the corresponding projecting portion of the opposed ferrule half, and projection means projecting in said recess of each ferrule half for engaging and gripping a jacket portion of an optical fiber cable received in said recess.

2. A ferrule as recited in claim 1, wherein, the mounting means comprises a flange on the exterior of each ferrule half and having the projecting portion extending from the corresponding mating surface and having therein the recess in the mating surface for receipt of the corresponding projecting portion of the opposed ferrule half.

3. A ferrule as recited in claim 1, wherein, the means for securing the ferrule halves together includes an adhesive.

4. A ferrule as recited in claim 1, wherein, the means for securing the ferrule halves together includes a bond of the ferrule halves to each other.

* * * * *